Patented July 31, 1928.

1,679,246

UNITED STATES PATENT OFFICE.

ALPHONSE GAMS AND GUSTAV WIDMER, OF BASEL, SWITZERLAND, ASSIGNORS TO THE FIRM "SOCIETY OF CHEMICAL INDUSTRY IN BASLE," OF BASEL, SWITZERLAND.

RECOVERY OF INSOLUBLE UREA FORMALDEHYDE RESINS.

No Drawing. Application filed January 4, 1926, Serial No. 79,262, and in Switzerland January 17, 1925.

Our invention relates to a process of converting into soluble form insoluble condensation products of urea and formaldehyde.

According to this invention boiling formaldehyde solution dissolves the highly polymerized solid or gelatinous condensation products of urea, or a derivative thereof, and formaldehyde, thus producing solutions of lower condensation or polymerization stages of these products in excess of formaldehyde.

The excess of formaldehyde can either be distilled or advantageously condensed with the corresponding quantity of urea or its derivatives (e. g. about one molecule of urea to two molecules of formaldehyde), by heating the solution to which the urea has been added in presence or absence of a condensing agent and in a basic, neutral or acid medium in the known manner.

By the invention it becomes possible to utilize the comparatively considerable quantities of waste products (shavings and splinters) produced in the working of solid condensation products of urea or its derivatives and formaldehyde, so that there need be no residue in the manufacture.

When the hardening of the parent material has progressed far, the heating of the insoluble condensation or polymerization product with formaldehyde is preferably conducted under pressure at temperatures above 100° C. If the products to be treated contain inert filling materials the latter may be separated by filtration when solution has occurred. The newly formed condensation products can be mixed with filling materials, colouring matters or the like, as may be desired, during the operation which hardens them.

In the term "urea" also derivatives and substitution products of urea and in the term "formaldehyde" also polymerides of the latter shall be included.

The following examples illustrate the invention, the parts being by weight:—

Example 1.

200 parts of a hard condensation product from urea and formaldehyde, preferably in comminuted condition, are heated with 200 parts of formaldehyde of 36.5 per cent strength for 2 hours in an autoclave at 120° C. Complete solution occurs and the thick syrup obtained is soluble in water and possesses the properties of a water soluble initial condensation product of urea and formaldehyde. It is mixed with 60 parts of urea and the mixture is heated in a reflux apparatus for 10 hours to produce condensation. The mass is then concentrated and worked up in the usual manner.

When dealing with a parent material which was hardened by means of a noteworthy quantity of acid, the formaldehyde used for dissolving the material should be neutralized with bases.

Example 2.

200 parts of the waste (splinters, shavings), obtained in working solid hardened condensation products from urea and formaldehyde, are heated at 120° C. for 2–3 hours with 250 parts of formaldehyde of 36.5 per cent strength. There is obtained a thick solution which is diluted with 100 parts of water and then heated with 30 parts of urea for 16 hours. The mass obtained is evaporated to a syrup and may be worked up in the usual manner.

What we claim is:

1. A process of converting insoluble condensation products of urea and formaldehyde into a soluble form, by heating the product with aqueous formaldehyde under pressure.

2. A process of converting insoluble condensation products of urea and formaldehyde into a soluble form, by heating the product with aqueous formaldehyde under pressure and at a temperature above 100° C.

3. A process as referred to in claim 1, wherein the solution of the condensation product of urea and formaldehyde in aqueous formaldehyde thus obtained is mixed with urea to react with the formaldehyde and the condensation reaction is caused to take place.

4. A process as referred to in claim 2, wherein the solution of the condensation product of urea and formaldehyde in aqueous formaldehyde thus obtained is mixed with urea to react with the formaldehyde and the condensation reaction is caused to take place.

In witness whereof we have hereunto signed our names this 19th day of December 1925.

ALPHONSE GAMS.
GUSTAV WIDMER.